(12) United States Patent
Pandey et al.

(10) Patent No.: US 11,971,572 B2
(45) Date of Patent: Apr. 30, 2024

(54) OPTICAL WAVEGUIDE WITH STACKED CLADDING MATERIAL LAYERS

(71) Applicant: GlobalFoundries U.S. Inc., Malta, NY (US)

(72) Inventors: Shesh Mani Pandey, Saratoga Springs, NY (US); Yusheng Bian, Ballston Lake, NY (US); Francis O. Afzal, Cohoes, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/674,905

(22) Filed: Feb. 18, 2022

(65) Prior Publication Data

US 2023/0266526 A1 Aug. 24, 2023

(51) Int. Cl.
*G02B 6/036* (2006.01)
*G02B 6/028* (2006.01)

(52) U.S. Cl.
CPC .......... *G02B 6/0288* (2013.01); *G02B 6/036* (2013.01)

(58) Field of Classification Search
CPC .............................. G02B 6/0288; G02B 6/036
See application file for complete search history.

(56) References Cited

U.S. PATENT DOCUMENTS

| | | |
|---|---|---|
| 4,265,515 A | 5/1981 | Kao |
| 4,465,336 A | 8/1984 | Huber et al. |
| 6,289,157 B1 * | 9/2001 | Kawamoto ............ G02B 6/122 385/124 |
| 6,690,871 B2 | 2/2004 | Lee et al. |
| 10,670,804 B1 | 6/2020 | Bian et al. |

(Continued)

FOREIGN PATENT DOCUMENTS

| | | |
|---|---|---|
| EP | 0054226 A1 | 6/1982 |
| JP | 2015191110 A * | 11/2015 |
| WO | 2016123719 A1 | 8/2016 |

OTHER PUBLICATIONS

Wilmart et al., "A Versatile Silicon-Silicon Nitride Photonics Platform for Enhanced Functionalities and Applications," Applied Sciences, vol. 9, Issue 255, 2019, pp. 1-16.

(Continued)

*Primary Examiner* — Chris H Chu
(74) *Attorney, Agent, or Firm* — Anthony Canale; Hoffman Warnick LLC

(57) ABSTRACT

Disclosed is an optical waveguide including a waveguide core and waveguide cladding surrounding the waveguide core. The waveguide cladding includes at least one stack of cladding material layers positioned laterally adjacent to a sidewall of the waveguide core such that each cladding material layer in the stack abuts the sidewall of the waveguide core. Each of the cladding material layers in the stack has a smaller refractive index than the waveguide core and at least two of the cladding material layers in the stack have different refractive indices, thereby tailoring field confinement and reshaping the optical mode. Different embodiments include different numbers of cladding material layers in the stack, different stacking orders of the cladding material layers, different waveguide core types, symmetric or asymmetric cladding structures on opposite sides of the waveguide core, etc. Also disclosed is a method of forming the optical waveguide.

20 Claims, 18 Drawing Sheets

(56) References Cited

U.S. PATENT DOCUMENTS

| | | |
|---|---|---|
| 11,067,749 B2 | 7/2021 | Bian et al. |
| 11,237,250 B1* | 2/2022 | Alalusi .................. G01S 17/34 |
| 2004/0179804 A1 | 9/2004 | Kuramoto et al. |
| 2012/0003767 A1* | 1/2012 | Fujikata .................. G02F 1/025 438/22 |
| 2017/0299902 A1* | 10/2017 | Yu .......................... G02B 6/131 |
| 2019/0204504 A1* | 7/2019 | Chiles ................ G02B 6/02109 |
| 2023/0101580 A1 | 3/2023 | Cucci et al. |

OTHER PUBLICATIONS

Selvaraja et al., "Review on Optical Waveguides," IntechOpen, Emerging Waveguide Technology, Chapter 6, 2018, pp. 95-129.

Aboketaf et al., "Towards Fully Automated Testing and Characterization for Photonic Compact Modeling on 300-mm Wafer Platform," OSA 2021, pp. 1-3.

Bian et al., "Towards Low-Loss Monolithic Silicon and Nitride Photonic Building Blocks in State-of-the-Art 300mm CMOS Foundry," Frontiers in Optics/Laser Science, OSA 2020, pp. 1-2.

Nummy et al., "300-mm Monolithic Silicon Photonics Foundry Technology," IEEE Journal of Selected Topics in Quantum Electronics, vol. 25, No. 5, 2019, pp. 1-12.

Rakowski et al., "45nm CMOS—Silicon Photonics Monolithic Technology (45CLO) for Next-Generation, Low Power and High Speed Optical Interconnects," OSA 2020, pp. 1-3.

Bian et al., "Monolithically Integrated Silicon Nitride Platform," OSA 2021, pp. 1-3.

Mahariq et al., "Mode Analysis and Light Confinement of Optical Rib Waveguides in Various Air Slot Configurations," IEEE, 2015, pp. 1-5.

* cited by examiner

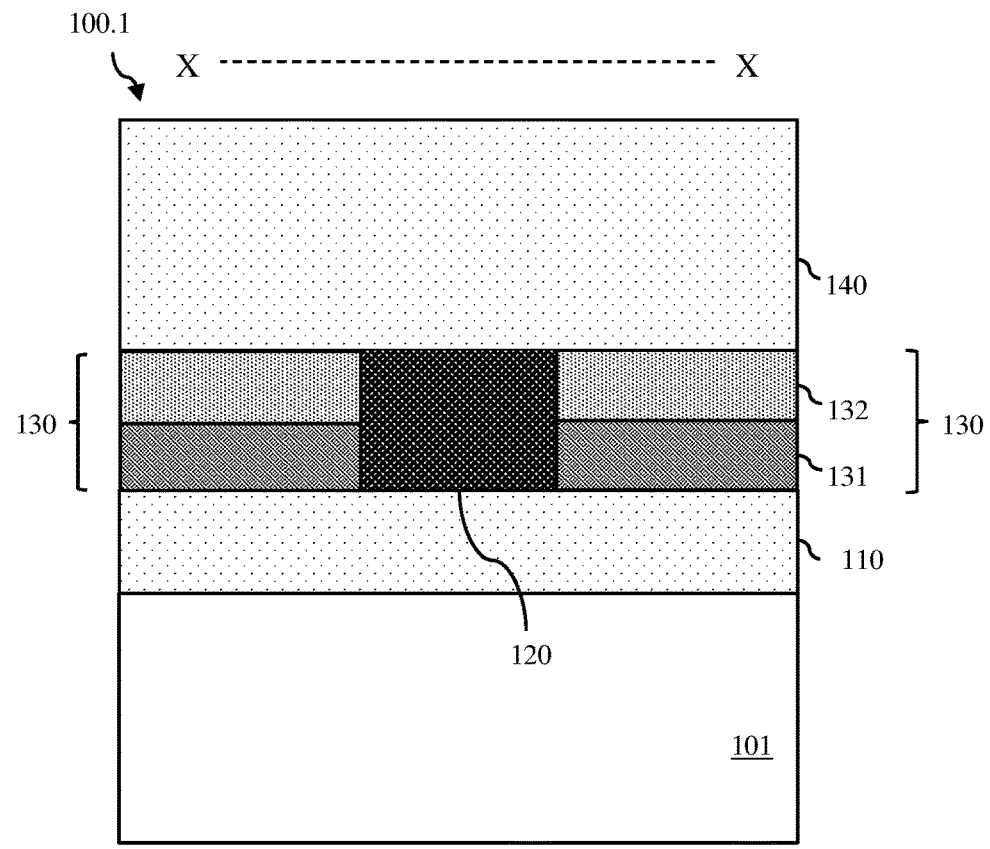
FIG. 1.1
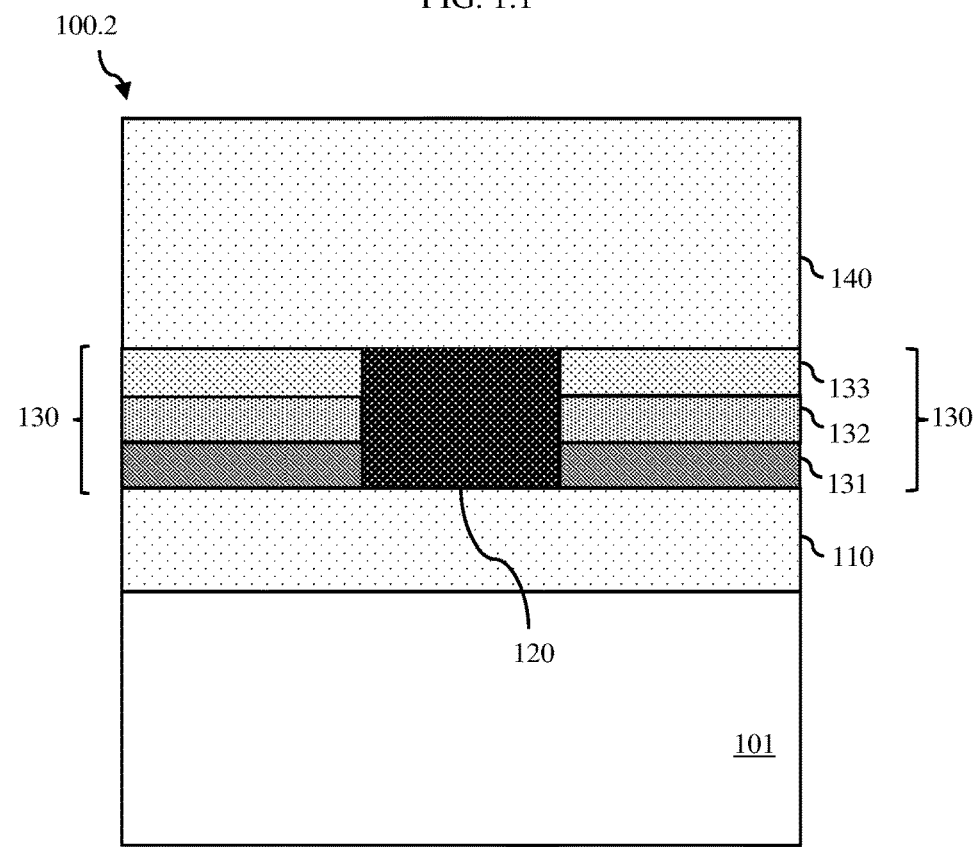
FIG. 1.2

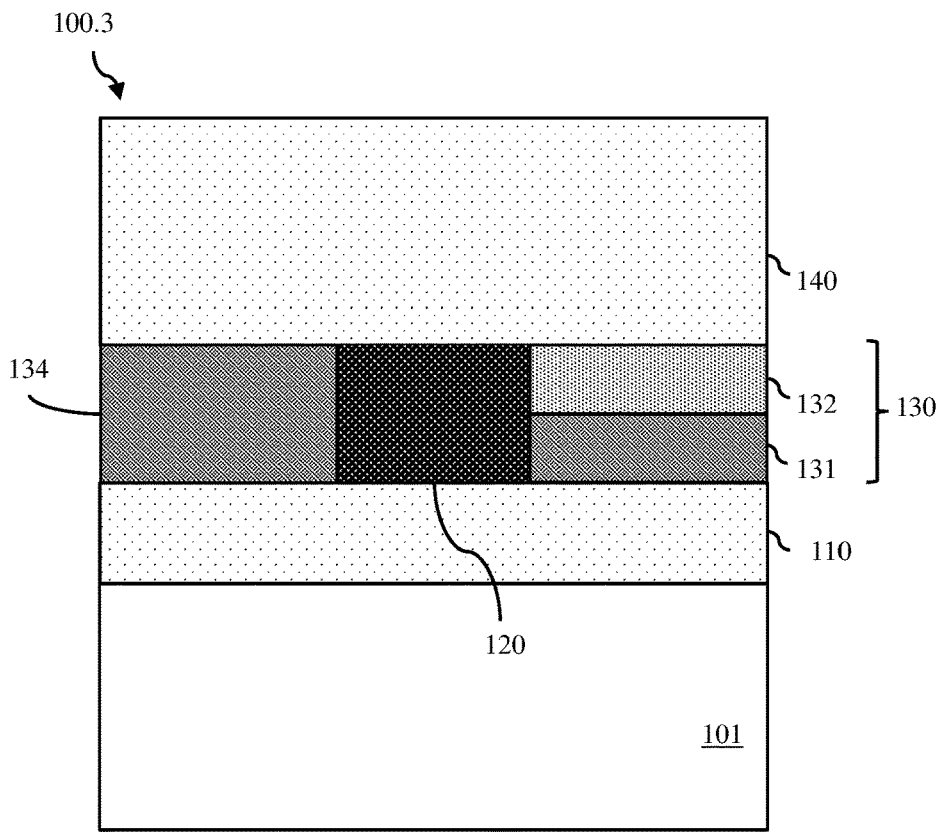
FIG. 1.3
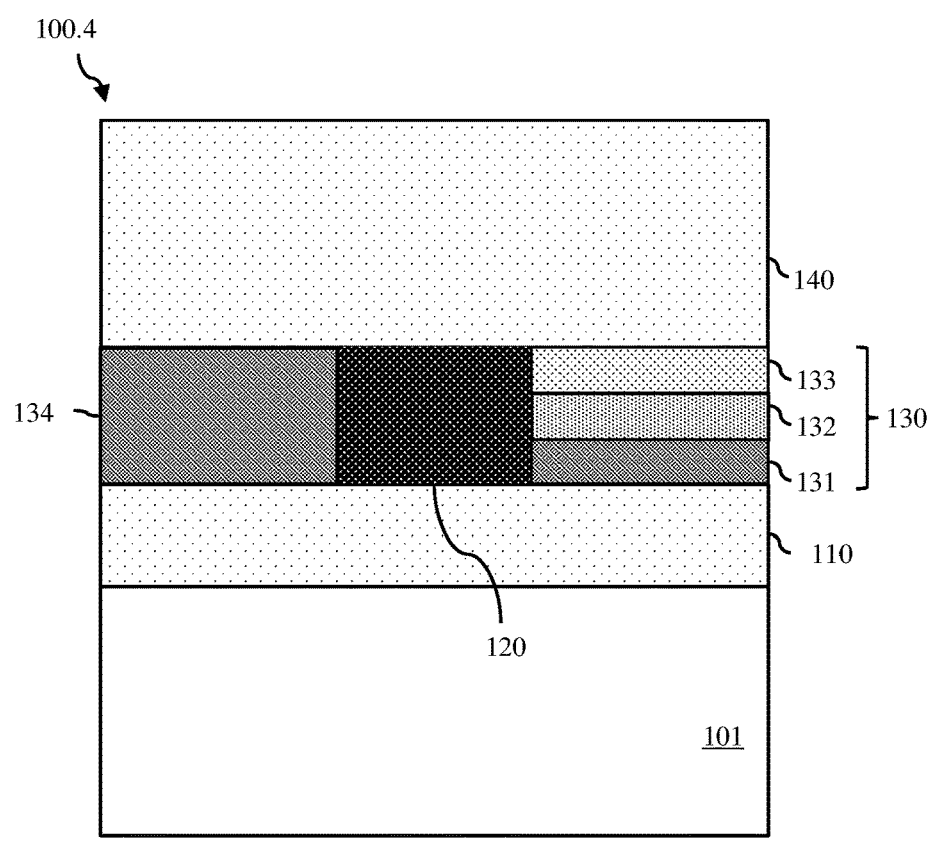
FIG. 1.4

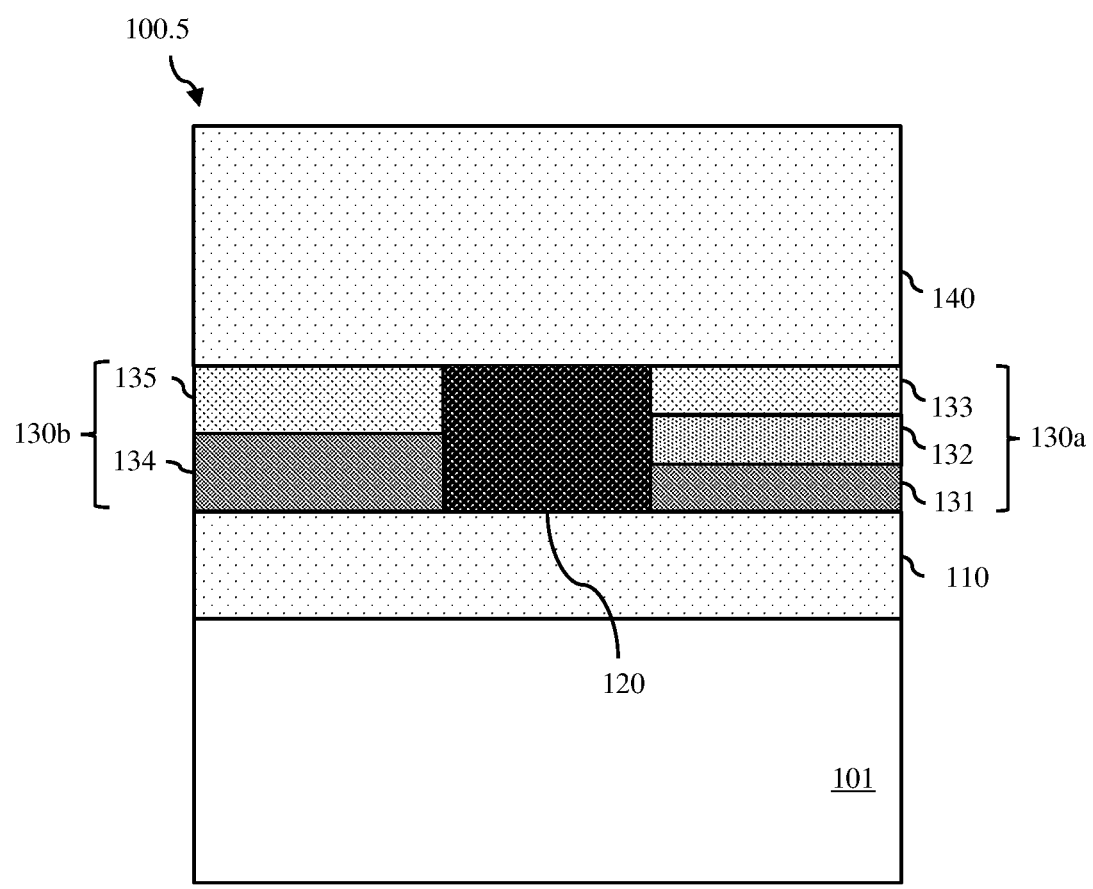
FIG. 1.5

FIG. 3.1a
FIG. 3.1b
FIG. 3.2a
FIG. 3.2b
FIG. 3.3a
FIG. 3.3b
FIG. 3.4a
FIG. 3.4b
FIG. 3.5a
FIG. 3.5b
FIG. 3.5c
FIG. 3.5d

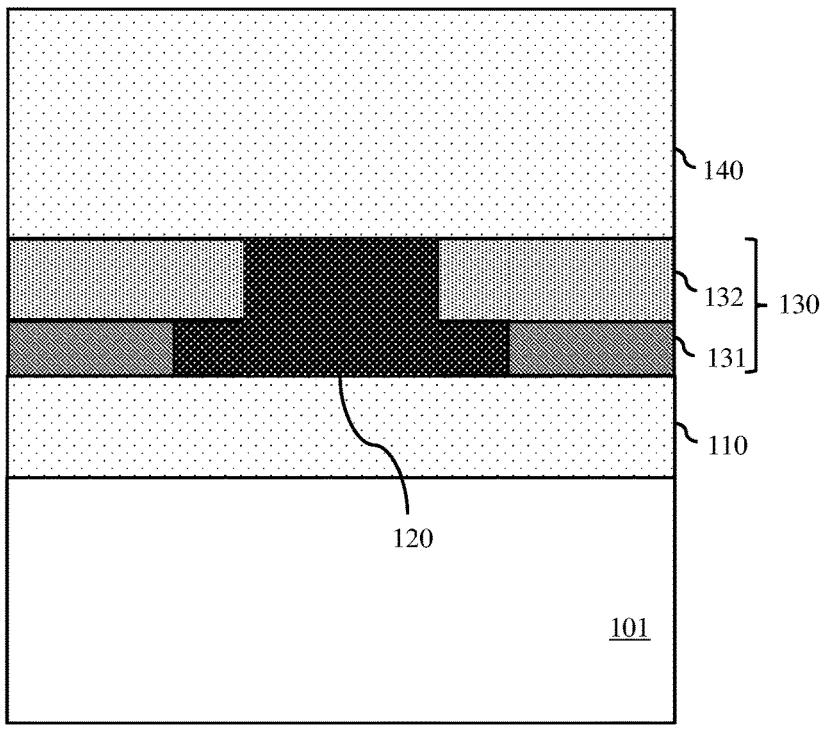
FIG. 4.1
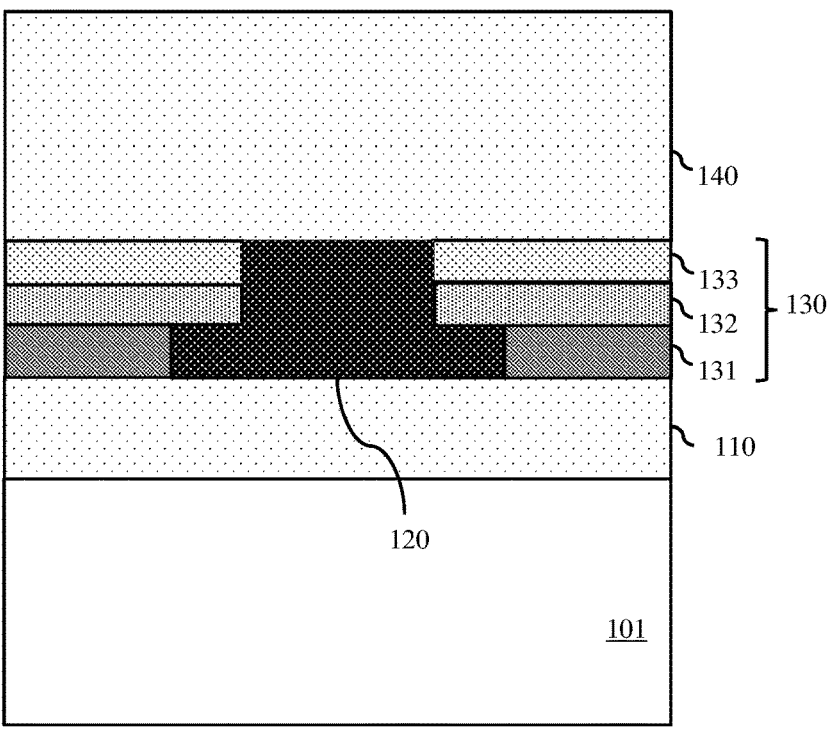
FIG. 4.2

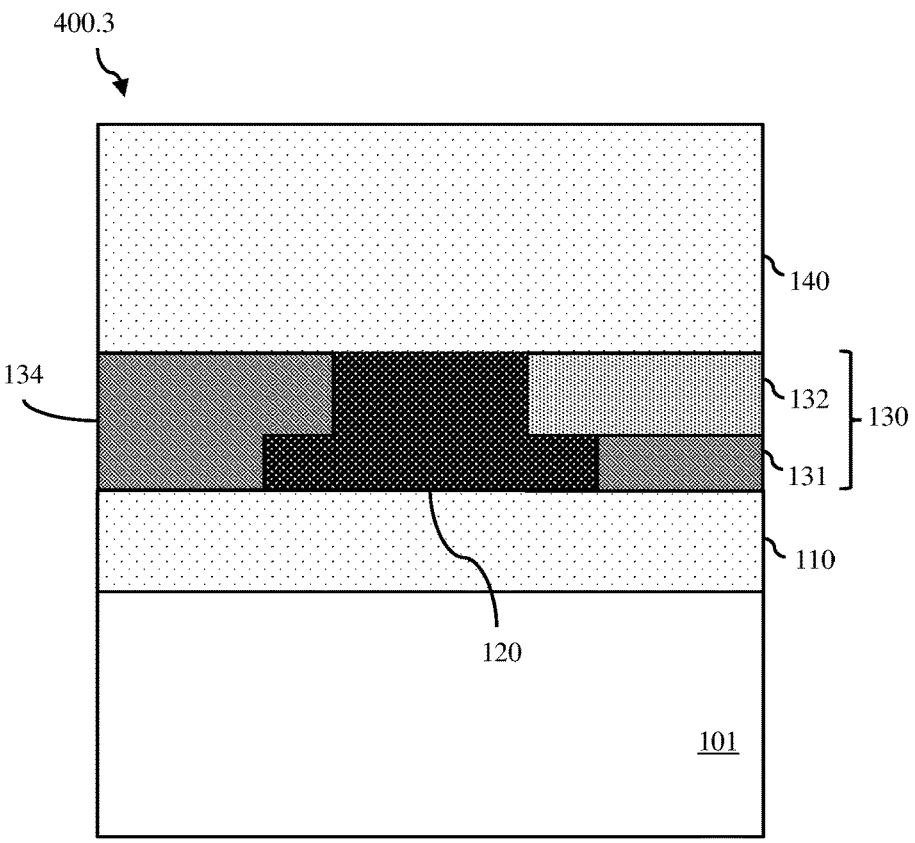
FIG. 4.3
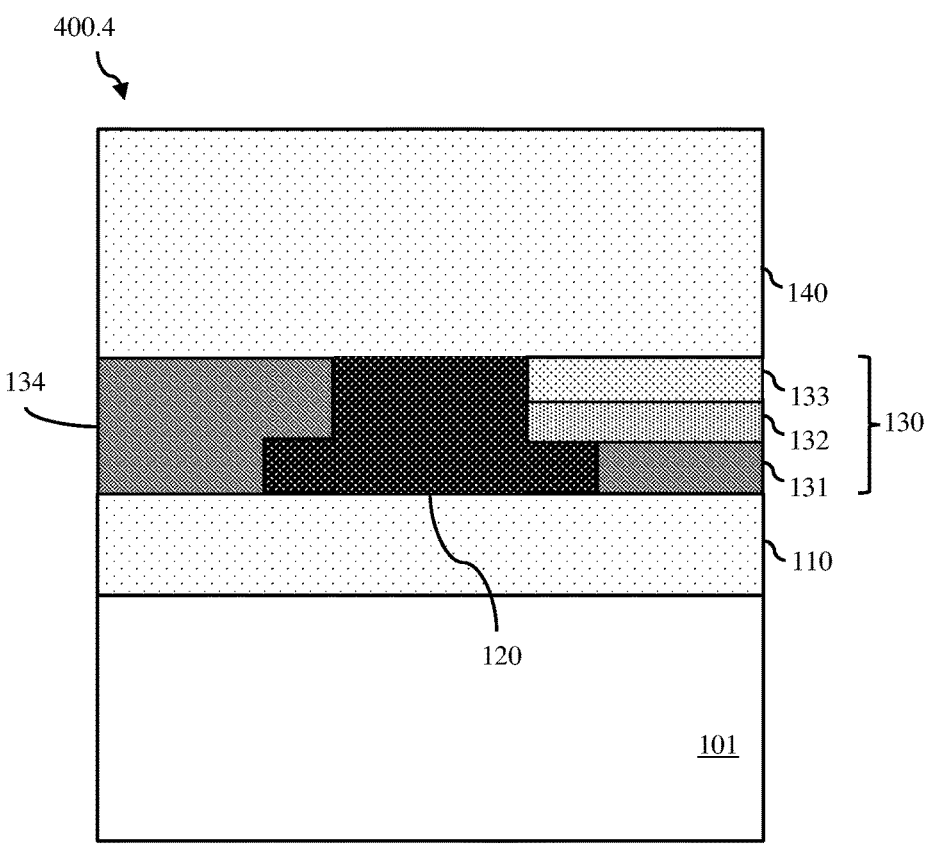
FIG. 4.4

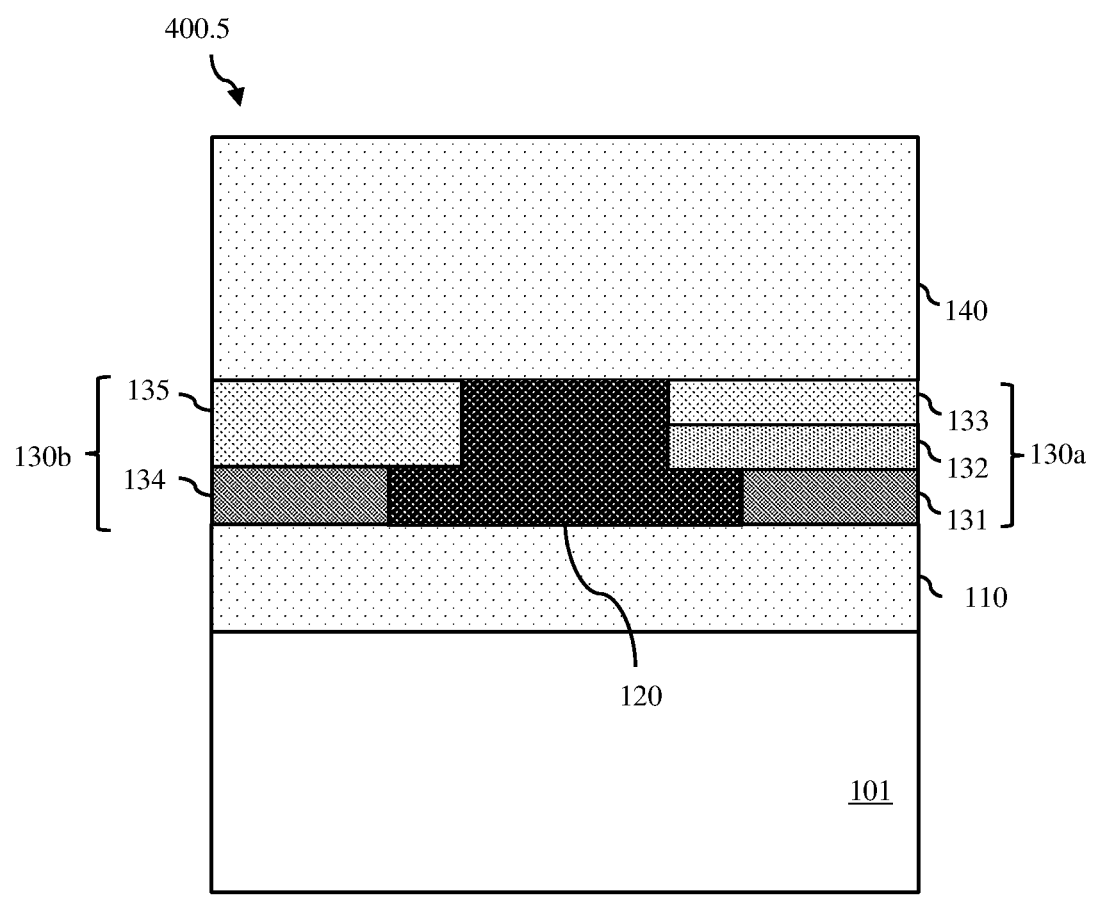
FIG. 4.5

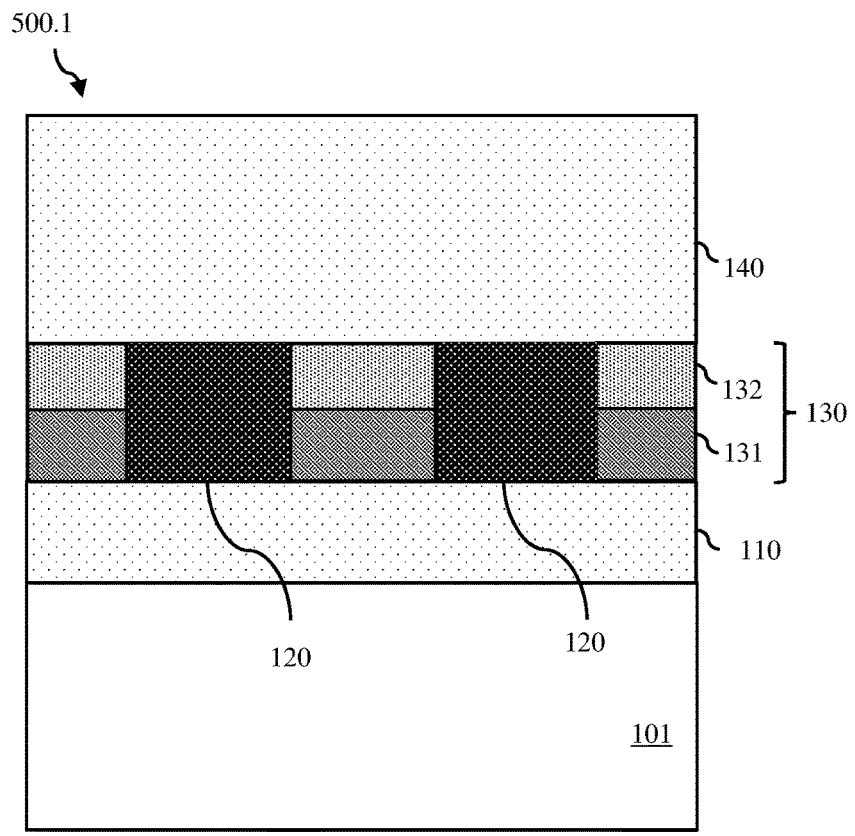
FIG. 5.1
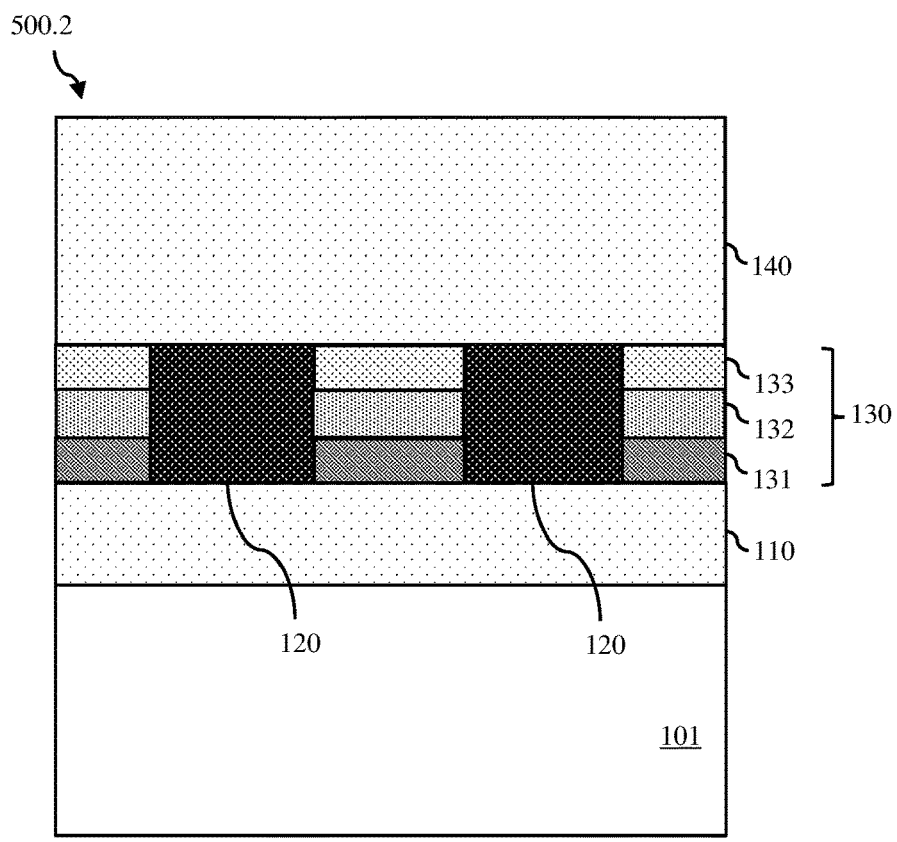
FIG. 5.2

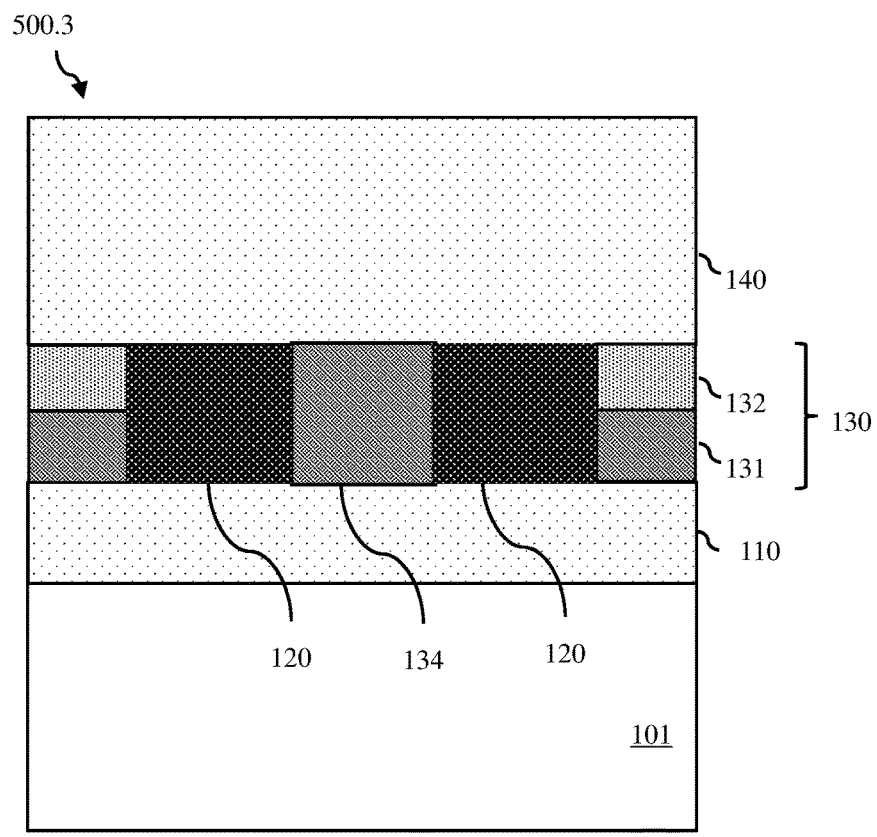
FIG. 5.3
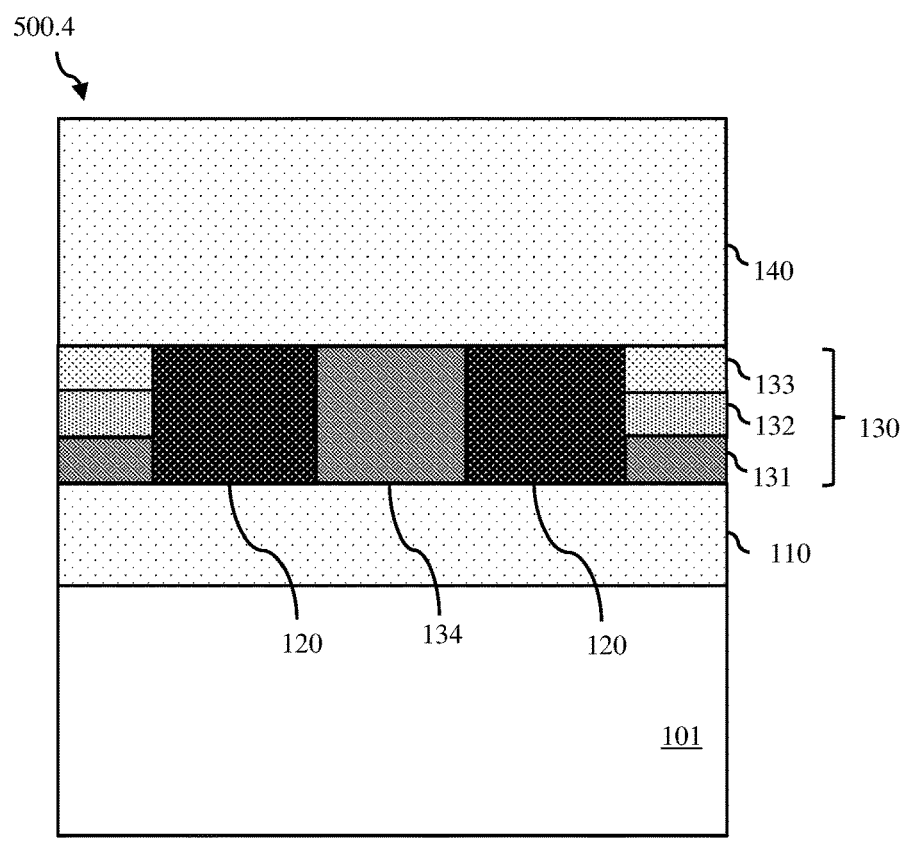
FIG. 5.4

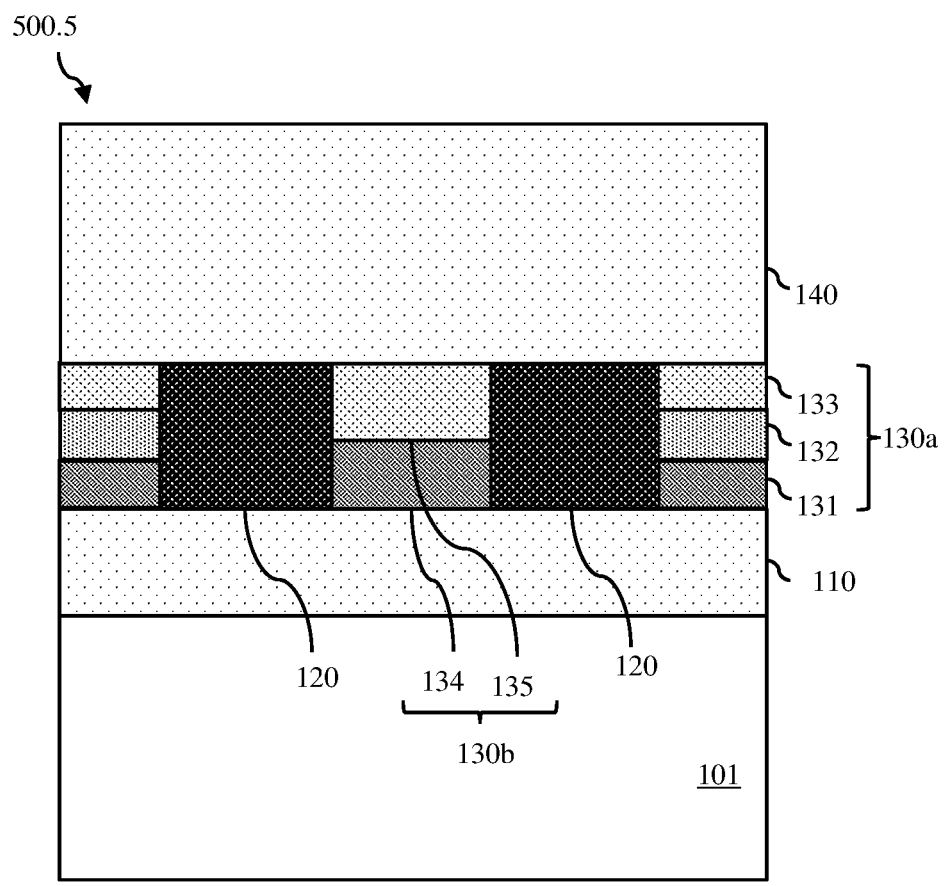
FIG. 5.5

US 11,971,572 B2

OPTICAL WAVEGUIDE WITH STACKED CLADDING MATERIAL LAYERS

BACKGROUND

Field of the Invention

The present invention relates to optical waveguides and, more particularly, to embodiments of an optical waveguide and a method of forming the optical waveguide.

Description of Related Art

An optical waveguide is a physical structure that guides optical signal propagation in a photonic integrated circuit (PIC) structure. Such an optical waveguide can include a waveguide core (also referred to as a transmission medium) in an elongated shape and surrounded by waveguide cladding. The waveguide core and the waveguide cladding can be different materials and, specifically, the core material can have a larger refractive index than the cladding material. The function of the waveguide cladding is to confine optical signals within the waveguide core by reflection at the interfaces between the core and cladding materials in order to facilitate optical signal propagation through the waveguide core. Confinement of optical signals within the waveguide core is established as a function of the refractive index contrast between the core and cladding materials. Specifically, the higher the refractive index contrast between the core and cladding materials, the greater the confinement, and vice versa. Additionally, the shape and position of the area through which light signals are propagated within the waveguide core (referred to herein as the optical mode) is established as a function of the dimensions of the waveguide core (including the width, the height, patterned shape, etc.) and/or by the refractive index of the core material. Thus, the optical mode is typically steered (i.e., selectively adjusted or shifted) by adjusting the dimensions of the waveguide core and/or by changing the core material so it has a different refractive index.

SUMMARY

Disclosed herein are embodiments of an optical waveguide with stack(s) of cladding material layers on one or both sides of the waveguide core for tailoring field confinement and the shape of the optical mode. In each of the embodiments, the optical waveguide can include a waveguide core. The optical waveguide can further include a stack of cladding material layers positioned laterally adjacent to a sidewall of the waveguide core such that each of the cladding material layers in the stack abuts the sidewall. All of the cladding material layers in the stack can have smaller refractive indices than the waveguide core. Furthermore, at least two of the cladding material layers in the stack can have different refractive indices.

In some embodiments of the optical waveguide, the stack can have just two cladding material layers. In other embodiments of the optical waveguide, the stack can have three or more cladding material layers. For example, an embodiment of an optical waveguide disclosed herein can include a waveguide core and a stack of three cladding material layers positioned laterally adjacent to a sidewall of the waveguide core such that each of the three cladding material layers in the stack abuts the sidewall. All three of the cladding material layers in the stack can have smaller refractive indices than the waveguide core. Furthermore, at least two of the three cladding material layers in the stack can have different refractive indices.

Also disclosed herein are embodiments of a method of forming an optical waveguide with stack(s) of cladding material layers on one or both sides of the waveguide core for tailoring field confinement and the shape of the optical mode. Specifically, the method embodiments can include forming a waveguide core and also forming a stack of cladding material layers. The processes of forming the waveguide core and forming the stack of cladding material layers can be performed such that, in the resulting optical waveguide, the stack is positioned laterally adjacent to a sidewall of the waveguide core, each of the cladding material layers in the stack abuts the sidewall and at least two of the cladding material layers in the stack have different refractive indices.

By including such stack(s) of cladding material layers with different refractive indices adjacent to one or both sidewalls of the waveguide core, designers can tailor field confinement and selectively reshape the optical mode of the optical waveguide. As discussed in further in the detailed description section, in addition to differing with respect to the number of cladding material layers in the stack, embodiments of the optical waveguide and of the associated methods of forming the optical waveguide can also differ with respect to the order of the cladding material layers within the stack, with respect to the waveguide type (e.g., ridge, rib, slot, etc.), with respect to the specific materials used for the waveguide core and cladding, with respect to whether or not the optical waveguide includes symmetric stacks of cladding material layers on opposing sidewalls of the waveguide core, etc.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 1.1-1.5 are cross-section diagrams illustrating embodiments, respectively, of an optical waveguide in a photonic integrated circuit (PIC) structure;

FIGS. 3.1a-3.1b, 3.2a-3.2b, 3.3a-3.3b, 3.4a-3.4b, 3.5a-3.5d are exemplary optical mode shapes for the optical waveguides of FIGS. 1.1, 1.2, 1.3, 1.4 and 1.5, respectively;

FIGS. 4.1-4.5 are cross-section diagrams illustrating alternative embodiments, respectively, of an optical waveguide in a photonic integrated circuit (PIC) structure;

FIGS. 5.1-5.5 are cross-section diagrams illustrating additional alternative embodiments, respectively, of an optical waveguide in a photonic integrated circuit (PIC) structure;

DETAILED DESCRIPTION

Figure 2A:
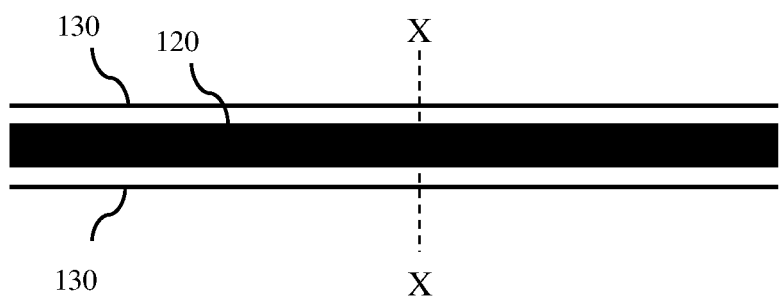
FIGS. 2A-2D are layout diagrams illustrating exemplary optical waveguide shapes.

As mentioned above, an optical waveguide is a physical structure that guides optical signal propagation in a photonic integrated circuit (PIC) structure. Such an optical waveguide can include a waveguide core (also referred to as a transmission medium) in an elongated shape and surrounded by waveguide cladding. The waveguide core and the waveguide cladding can be different materials and, specifically, the core material can have a larger refractive index than the cladding material. The function of the waveguide cladding is to confine optical signals within the waveguide core by reflection at the interfaces between the core and cladding materials in order to facilitate optical signal propagation through the waveguide core. Confinement of optical signals within the waveguide core is established as a function of the refractive index contrast between the core and cladding materials. Specifically, the higher the refractive index contrast between the core and cladding materials, the greater the confinement, and vice versa. Additionally, the shape and position of the area through which light signals are propagated within the waveguide core (referred to herein as the optical mode) is established as a function of the dimensions of the waveguide core (including the width, the height, patterned shape, etc.) and/or by the refractive index of the core material. Thus, the optical mode is typically steered (i.e., selectively adjusted or shifted) by adjusting the dimensions of the waveguide core and/or by changing the core material so it has a different refractive index.

In view of the foregoing, disclosed herein are embodiments of an optical waveguide with stacked cladding material layers on one or both sides of the waveguide core for tailoring field confinement and the shape of the optical mode. Specifically, the optical waveguide can include a waveguide core and waveguide cladding surrounding the waveguide core. The waveguide cladding can include at least one stack of cladding material layers positioned laterally adjacent to a sidewall of the waveguide core such that each cladding material layer in the stack abuts the sidewall of the waveguide core. Each of the cladding material layers in the stack can have a smaller refractive index than the waveguide core and at least two of the cladding material layers in the stack can have different refractive indices, thereby tailoring field confinement and reshaping the optical mode. Different embodiments can include different numbers of cladding material layers in the stack, different waveguide core types, symmetric or asymmetric cladding structures on opposite sides of the waveguide core, etc. Also disclosed herein are method embodiments for forming the optical waveguide.

FIGS. 1.1-1.5 are cross-section diagrams illustrating various embodiments of an optical waveguide 100.1-100.5, respectively, in a photonic integrated circuit (PIC) structure.

As illustrated in FIGS. 1.1-1.5, the PIC structure can include a substrate 101. The substrate 101 can be, for example, a semiconductor substrate, such as a silicon substrate. Optionally, the PIC structure can further include an insulator layer 110 on the substrate 101. The insulator layer 110 can be, for example, a silicon dioxide layer (also referred to herein as a buried oxide (BOX) layer), which has refractive index that is smaller than 1.6. The PIC structure can further include the optical waveguide 100.1-100.5.

Figure 2B:
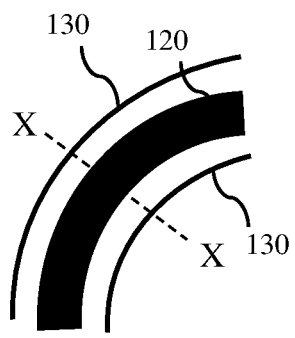
Figure 2D:
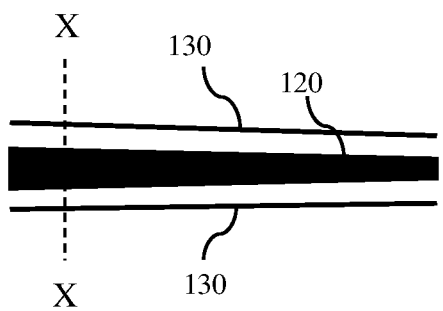
Figure 2C:
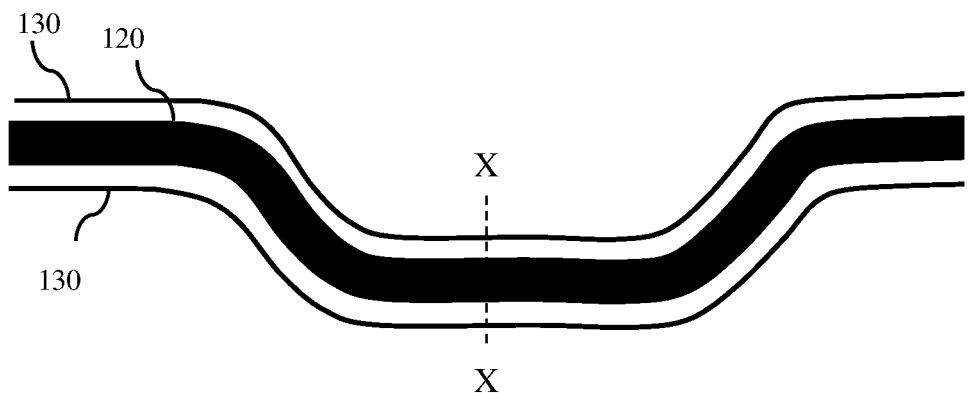

The optical waveguide 100.1-100.5 can include a waveguide core 120. For purposes of illustration, the waveguide core 120 is shown in the FIGS. 1.1-1.5 as having a shape suitable for a ridge-type waveguide. That is, the cross-sectional shape of the waveguide core 120 along its width is essentially rectangular with a planar bottom surface, a planar top surface opposite the planar bottom surface, and opposing sidewalls, which are oriented essentially perpendicular to the insulator layer 110. The top down view shape of the waveguide core 120 can be elongated and vary (e.g., depending upon the application). For example, the waveguide core 120 could be linear (e.g., see the linear waveguide core in the top view layout diagram of FIG. 2A), could be curved (e.g., see the curved waveguide core in the top view layout of FIG. 2B), or could have both linear and curved sections (e.g., see the waveguide core in the top view layout diagram of FIG. 2C). Furthermore, the waveguide core 120 could have an essentially uniform width (e.g., as shown in FIGS. 2A-2C) or could have varying widths (e.g., see the tapered waveguide core, which has a width that decreases from one end to the other, in the top view layout diagram of FIG. 2D), etc. It should be understood that the figures are not intended to be limiting and that waveguide core 120 could have any other suitable elongated shape with opposing sidewalls.

The waveguide core 120 can be made of a core material (also referred to herein as a transmission medium). The core material could be, for example, a silicon and nitrogen-containing compound, such as standard stoichiometric silicon nitride ($Si_3N_4$) or some other suitable silicon and nitrogen-containing compound. Those skilled in the art will recognize that silicon and nitrogen-containing compounds can have refractive indices in the range of, for example, approximately 1.8 to approximately 2.8 or even larger (e.g., up to 3.2). Alternatively, the core material could be silicon. Those skill in the art will recognize that silicon can have a refractive index in the range of, for example, approximately 3.3 to approximately 3.6. Alternatively, the core material could be any other suitable waveguide core material. The waveguide core 120 can be surrounded by waveguide cladding. That is, the waveguide cladding can cover the bottom surface, top surface, and opposing sidewalls of the waveguide core 120.

The waveguide cladding can include materials that are different from the core material and, more particularly, can include only materials having refractive indices that are smaller than that of the waveguide core 120. As mentioned above, in an optical waveguide the function of the waveguide cladding is to confine optical signals within the waveguide core by reflection at the interfaces between the core and cladding materials in order to facilitate optical signal propagation through the waveguide core. Confinement of optical signals within the waveguide core is established as a function of the refractive index contrast between the core and cladding materials. Specifically, the higher the refractive index contrast between the core and cladding materials, the greater the confinement, and vice versa.

In each of the disclosed embodiments, the waveguide cladding can include at least one stack 130 of two or more cladding material layers positioned laterally adjacent to at least one of the sidewalls of the waveguide core 120.

In some embodiments (e.g., see the optical waveguides 100.1 and 100.2 of FIGS. 1.1 and 1.2, respectively), the cladding structures on opposing sides of the waveguide core 120 can be symmetric. For example, the optical waveguide 100.1 shown in FIG. 1.1 includes symmetric stacks 130 positioned laterally immediately adjacent to opposing sidewalls of the waveguide core 120. Each stack 130 includes two cladding material layers (i.e., a first cladding material layer 131 and a second cladding material layer 132 above and immediately adjacent to the first cladding material layer 131). The optical waveguide 100.2 shown in FIG. 1.2 similarly includes symmetric stacks 130 positioned laterally immediately adjacent to opposing sidewalls of the waveguide core 120. However, in this case, each stack 130 includes three cladding material layers (i.e., a first cladding material layer 131, a second cladding material layer 132 above and immediately adjacent to the first cladding material layer 131, and a third cladding material layer 133 above and immediately adjacent to the second cladding material layer 132).

In other embodiments (e.g., see the optical waveguides 100.3, 100.4 and 100.5 of FIGS. 1.3, 1.4, and 1.5, respectively), the cladding structures on opposing sides of the waveguide core 120 can be asymmetric. For example, the optical waveguide 100.3 shown in FIG. 1.3 includes: a stack 130, which positioned laterally immediately adjacent to one sidewall of the waveguide core 120 and which includes two cladding material layers (i.e., a first cladding material layer 131 and a second cladding material layer 132 above and immediately adjacent to the first cladding material layer 131); and a single additional cladding material layer 134, which is positioned laterally immediately adjacent to and covers the opposite sidewall of the waveguide core 120. The optical waveguide 100.4 shown in FIG. 1.4 includes: a stack 130, which is positioned laterally adjacent to one sidewall of the waveguide core 120 and which includes three cladding material layers (i.e., a first cladding material layer 131, a second cladding material layer 132 above and immediately adjacent to the first cladding material layer 131, and a third cladding material layer 133 above and immediately adjacent to the second cladding material layer 132); and a single additional cladding material layer 134, which is positioned laterally immediately adjacent to and covers the opposite sidewall of the waveguide core 120. The optical waveguide 100.5 shown in FIG. 1.5 includes two asymmetric stacks 130a and 130b and, more particularly: a stack 130, which positioned laterally immediately adjacent to one sidewall of the waveguide core 120 and which includes three cladding material layers (i.e., a first cladding material layer 131, a second cladding material layer 132 above and immediately adjacent to the first cladding material layer 131, and a third cladding material layer 133 above and immediately adjacent to the second cladding material layer 132); and an additional stack 130b, which is positioned laterally immediately adjacent to the opposite sidewall of the waveguide core 120 and which include a different number of cladding material layers (e.g., see cladding material layers 134-135 in the stack 130b).

In any case, all the cladding material layers in a stack 130 can abut and, particularly, can have proximal ends positioned laterally immediately adjacent to a sidewall of the waveguide core 120. That is, each of the cladding material layers 131-132 in the two-layer stacks shown in FIGS. 1.1, 1.3 and 1.5 abut the waveguide core 120. Similarly, each of the cladding material layers 131-133 in the three-layer stacks shown in FIGS. 1.2, 1.4 and 1.5 abut the waveguide core 120. Furthermore, all of the cladding material layers in each stack 130 have smaller refractive indices than the waveguide core 120 and at least two of the cladding material layers in each stack 130 have different refractive indices. Specifically, in the two-layer stacks shown in FIGS. 1.1, 1.3 and 1.5, the first cladding material layer 131 has a first refractive index, the second cladding material layer 132 has a second refractive index that is different from the first refractive index. Additionally, the first and second refractive indices of the first and second cladding material layers 131-132 are smaller than the refractive index of the waveguide core 120. Similarly, in the three-layer stacks shown in FIGS. 1.2, 1.4 and 1.5, the first cladding material layer 131 has a first refractive index, the second cladding material layer 132 has a second refractive index that is different from the first refractive index, and the third cladding material layer 133 has a third refractive index that is at least different from the second refractive index. Additionally, the first, second and third refractive indices of the first, second and third cladding material layers 131-133 are smaller than the refractive index of the waveguide core 120.

It should be noted that the refractive index order of the cladding material layers within each stack 130 can be preselected in order to selectively tailor (i.e., adjust, steer, etc.) field confinement and the shape of the optical mode.

For example, consider the optical waveguide 100.1 of FIG. 1.1 with the symmetric two-layer stacks 130. If, in each stack 130, the first refractive index of the first cladding material layer 131 is larger than the second refractive index of the second cladding material layer 132, then the shape of the optical mode can mimic that of a rib-type waveguide core, as illustrated in FIG. 3.1a. As a result, there is reduced modal overlap with the sidewall, leading to lower scatter loss. However, if, in each stack 130, the first refractive index of the first cladding material layer 131 is smaller than the second refractive index of the second cladding material layer 132, then the optical mode can be T-shaped or the like, as illustrated in FIG. 3.1b.

Consider the optical waveguide 100.2 of FIG. 1.2 with the symmetric three-layer stacks 130. If, in each stack 130, the first refractive index of the first cladding material layer 131 and the third refractive index of the third cladding material layer 133 are the same and larger than the second refractive index of the second cladding material layer 132, then the optical mode can be I-shaped or the like, as illustrated in FIG. 3.2a. However, if, in each stack 130, the first refractive index of the first cladding material layer 131 and the third refractive index of the third cladding material layer 133 are the same and smaller than the second refractive index of the second cladding material layer 132, then the optical mode can be cross-shaped or the like, as illustrated in FIG. 3.2b.

Consider the optical waveguide 100.3 of FIG. 1.3 with the asymmetric cladding structure configuration. If, in the stack 130 on only one side of the waveguide core 120, the first refractive index of the first cladding material layer 131 is larger than the second refractive index of the second cladding material layer 132, then the optical mode can be L-shaped or the like, as illustrated in FIG. 3.3a. However, if, in the stack 130 on only one side of the waveguide core 120, the first refractive index of the first cladding material layer 131 is smaller than the second refractive index of the second cladding material layer 132, then the optical mode can be flipped to have an upside-down L-shape or the like, as illustrated in FIG. 3.3b.

Consider the optical waveguide 100.4 of FIG. 1.4 with the asymmetric cladding structure configuration. If, in the stack 130 on only one side of the waveguide core 120, the first refractive index of the first cladding material layer 131 and the third refractive index of the third cladding material layer 133 are the same and larger than the second refractive index of the second cladding material layer 132, then the optical mode can be C-shaped or the like, as illustrated in FIG. 3.4a. However, if, in the stack 130 on only one side of the waveguide core 120, the first refractive index of the first cladding material layer 131 and the third refractive index of the third cladding material layer 133 are the same and smaller than the second refractive index of the second cladding material layer 132, then the optical mode can be differently shaped, as illustrated in FIG. 3.4b.

Consider also the even more complex optical mode shapes achievable with the asymmetric stacks 130a and 130b and different refractive index orders, as shown in FIGS. 3.5a-3.5c.

The following is a list of exemplary cladding materials that could be employed in the disclosed optical waveguide embodiments, depending upon the core material (and refractive index (n) thereof):
  (1) HfO2 (Hafnium dioxide), n=2.0754@1.31 um, n=2.0709@1.55 um;
  (2) ZrO2 (Zirconium dioxide, Zirconia), n=2.1155@1.31 um, n=2.1103@1.55 um;
  (3) Si3N4, n=~2;
  (4) SiON, n=~1.46 to ~2.1;
  (5) AlN (Aluminum nitride), n=~2.1 to ~2.4;
  (6) TiO2 (Titanium dioxide), n=2.4622 @1.31 um, n=2.4538 @ 1.55 um;
  (7) ZnO (Zinc monoxide), n=1.9318 @1.31 um, n=1.9267 @1.55 um;
  (8) Al$_2$O$_3$(Aluminum oxide), n=1.7503@1.31 um, n=1.7462@1.55 um;
  (9) MgO (Magnesium oxide), n=1.7178 @1.31 um, n=1.7146 @ 1.55 um;
  (10) SiO2 (Silicon dioxide), n<1.6, n=1.45 @1.31 um;
  (11) CaF2 (Calcium fluoride), n=1.4272 @1.31 um, n=1.4260 @ 1.55 um;
  (12) OMCTS (SiCOH) n=1.406 @1.31 um; and
  (13) MgF2 (Magnesium fluoride), n=1.3718 @1.31 um, n=1.3705 @ 1.55 um.

Thus, if the core material is a silicon and nitrogen-containing compound (e.g., Si3N4) with a refractive index of 2.0, then the cladding material layers of each stack 130 could be any of (7)-(13). If the core material is silicon with a refractive index of 3 or larger, then the cladding material layers of each stack 130 could be any of (1)-(13).

For purposes of illustration, the waveguide core 120 is shown in the figures as having a bottom surface immediately adjacent to the insulator layer 110 (e.g., a silicon dioxide layer, which as mentioned above has a refractive index smaller than 1.6). If the core material is a silicon and nitrogen-containing compound (e.g., Si$_3$N$_4$) with a refractive index of, for example, 2.0 or larger or if the core material is silicon with a refractive index of, for example, 3.0 or larger, then the insulator layer 110 will function as the cladding material covering the bottom surface of the waveguide core 120. It should be understood, however, that the figures are not intended to be limiting and that, alternatively, the waveguide core 120 could be located at some other level within or above the substrate 101 and the cladding material covering the bottom surface of the waveguide core 120 could include any other suitable configuration of cladding material layer(s).

Similarly, for purposes of illustration, the waveguide core 120 is shown in the figures as having a top surface immediately adjacent to and covered by an interlayer dielectric (ILD) material layer 140. This ILD material layer 140 should have a refractive index that is smaller than that of the core material (e.g., smaller than 2.0 in the case of an Si$_3$N$_4$ core or smaller than 3.0 in the case of a silicon core) such that the ILD material layer 140 functions as cladding material. Thus, for example, the ILD material layer 140 could also be a silicon dioxide layer (which as mentioned above has a refractive index smaller than 1.6). Alternatively, the ILD material layer 140 could be any other suitable ILD material layer with a refractive index smaller than that of the waveguide core 120. Alternatively, the cladding material covering the top surface of the waveguide core 120 could include any other suitable configuration of cladding material layer(s).

As mentioned above, for purposes of illustration, the waveguide core 120 is shown in FIGS. 1.1-1.5 as having a shape suitable for a ridge-type waveguide. That is, the cross-sectional shape of the waveguide core 120 shown in FIGS. 1.1-1.5 is essentially rectangular with a planar bottom surface, a planar top surface opposite the planar bottom surface, and opposing sidewalls, which are oriented essentially perpendicular to the top surface of the cladding material layer (i.e., essentially vertically oriented). It should, however, be understood that the figures are not intended to be limiting. Alternatively, the optical waveguide could be any other suitable type of optical waveguide (e.g., rib, slot, etc.).

For example, see the additional optical waveguide embodiments 400.1-400.5 of FIGS. 4.1-4.5, respectively, having essentially the same features as described above with respect to the embodiments 100.1-100.5 except that instead of having a shape suitable for a ridge-type waveguide, the waveguide core 120 has a shape suitable for a rib-type waveguide. That is, the cross-sectional shape of the waveguide core 120 shown in FIGS. 4.1-4.5 is has a relatively thin and relatively wide rectangular-shaped lower portion (also referred to in the art as a slab portion) and a relatively thick and relatively narrow rectangular-shaped upper portion on the lower portion.

For example, see also the additional optical waveguide embodiments 500.1-500.5 of FIGS. 5.1-5.5, respectively, having essentially the same features as described above with respect to the optical waveguide embodiments 100.1-100.5 except that instead of having a single waveguide core with a shape suitable for a ridge-type waveguide, the optical waveguide includes pair of parallel waveguide cores 120 with shapes suitable for a slot-type waveguide. Those skilled in the art will recognize that the pair of waveguide cores 120 of a slot-type waveguide can be separated by a subwavelength-scale low refractive index region through which strongly confined light is guided. In these embodiments, stacks 130 of cladding material layers can be between and on the outer sidewalls of the waveguide cores 120, as illustrated in the optical waveguides 500.1 and 500.2 of FIGS. 5.1 and 5.2. Alternatively, the cladding structure on the outer sidewalls of the waveguide cores 120 can be different from the cladding structure between the waveguide cores 120 (e.g., see the stacks 130 on the outer sidewalls of the waveguide cores 120 and the single cladding material layer 134 between the waveguide cores 120, as illustrated in the optical waveguides 500.3 and 500.4 of FIGS. 5.3 and 5.4; see also the stacks 130a on the outer sidewalls of the waveguide cores 120 and the different stack 130b between the waveguide cores 120, as illustrated in the optical waveguide 500.5 of FIG. 5.5).

Alternatively, the optical waveguide could be any other suitable type of optical waveguide.

Figure 6:
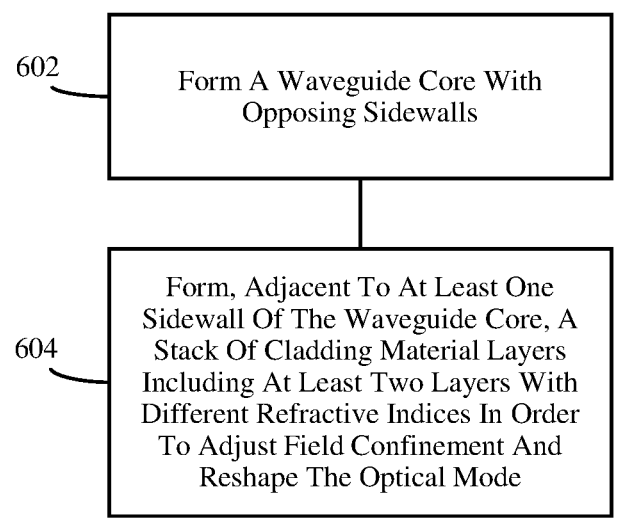
FIG. 6 is a flow diagram generally illustrating method embodiments for forming the disclosed optical waveguide embodiments.

Referring to the flow diagram of FIG. 6, also disclosed herein are method embodiments for forming an optical waveguide (e.g., any of the above-described optical waveguides 100.1-100.5 of FIGS. 1.1-1.5, respectively; any of the above-described optical waveguides 400.1-400.5 of FIGS. 4.1-4.5, respectively; or any of the above-described optical waveguides 500.1-500.5 of FIGS. 5.1-5.5, respectively)

including stack(s) of cladding material layers on one or both sides of the waveguide core for tailoring field confinement and the shape of the optical mode. Specifically, the method embodiments can include forming a waveguide core (see process 602) and forming at least one stack of cladding material layers positioned laterally adjacent to the waveguide core (see process 604). The processes 602-604 of forming the waveguide core and forming the stack(s) of cladding material layers can be performed such that, in the resulting optical waveguide, each stack of cladding material layers is positioned laterally adjacent to a sidewall of the waveguide core, each of the cladding material layers in each stack abuts the sidewall, all cladding material layers in each stack have refractive indices that are smaller than the refractive index of the waveguide core, and at least two of the cladding material layers in each stack have different refractive indices.

It should be noted that various different techniques could be employed for forming the waveguide core at process 602 and for forming the stack(s) of cladding material layers at process 604. Furthermore, depending upon the core material, the process 602 of forming the waveguide core may be performed after or before the process 604 of forming the stack(s) of cladding material layers.

Figure 7:
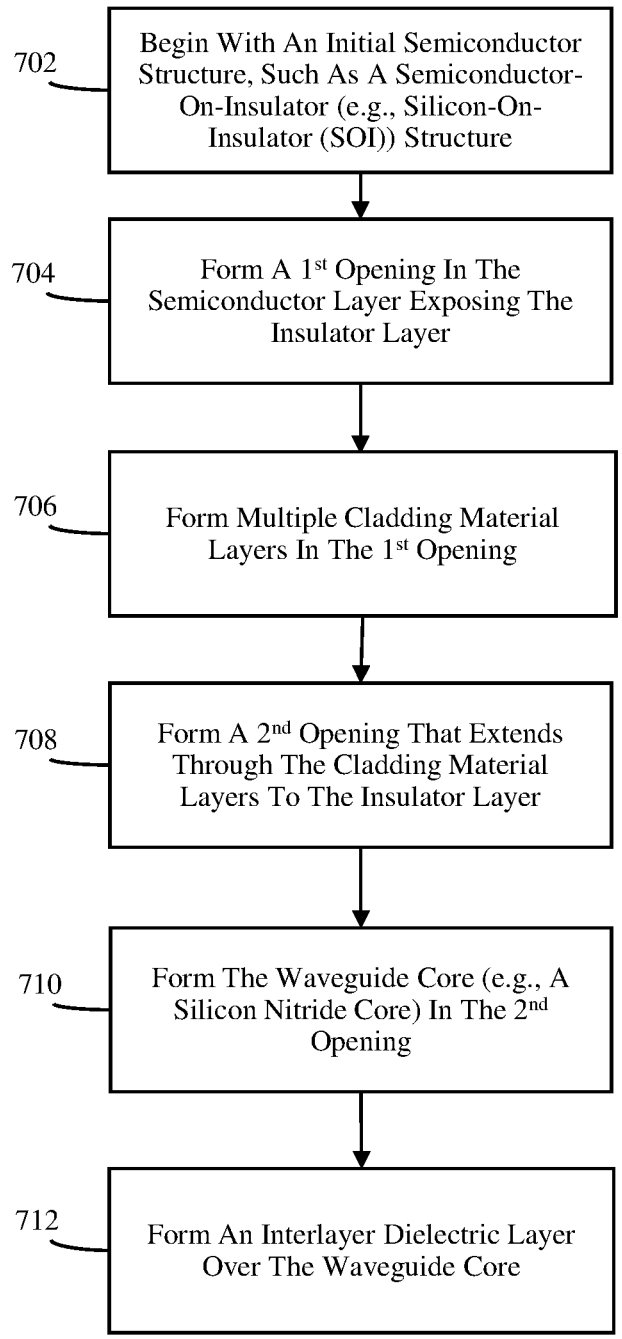
FIG. 7 is a flow diagram illustrating one exemplary technique for forming an optical waveguide.
Figure 8:
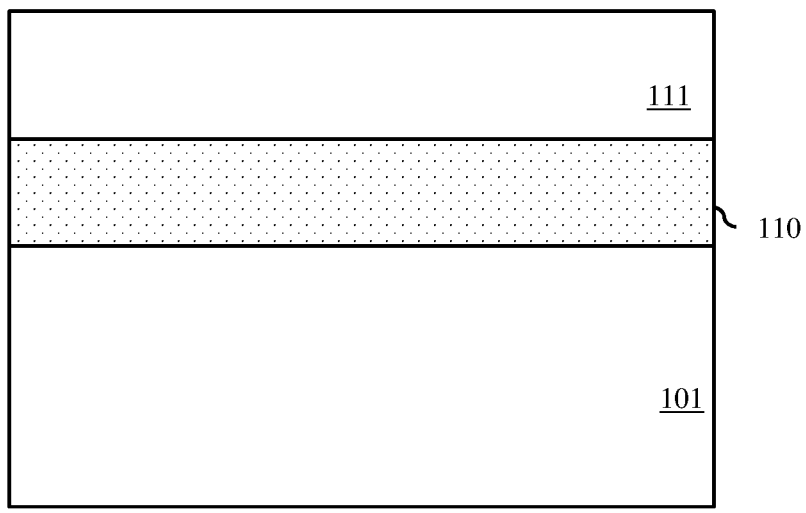
FIGS. 8-11 are cross-section diagrams illustrating partially completed structures formed according to the flow diagram of FIG. 7.

FIG. 7 is a flow diagram illustrating one exemplary technique for forming an optical waveguide. For purposes of illustration, this technique is described with respect to formation of the optical waveguide 100.2 shown in FIG. 1.2. Specifically, the method can begin with an initial semiconductor structure (see process 702 and FIG. 8). This initial semiconductor structure can be, for example, a semiconductor-on-insulator structure (e.g., a silicon-on-insulator (SOI) structure). Such a semiconductor-on-insulator structure can include, for example, a semiconductor substrate 101 (e.g., a silicon substrate), an insulator layer 110 (e.g., a silicon dioxide layer, also referred to herein as a buried oxide (BOX) layer) on the semiconductor substrate 101, and a semiconductor layer 111 on the insulator layer 110.

A first opening can be formed (e.g., lithographically patterned and etched) in the semiconductor layer 111 so as to expose an area of the insulator layer 110 (see process 704).

Figure 9:
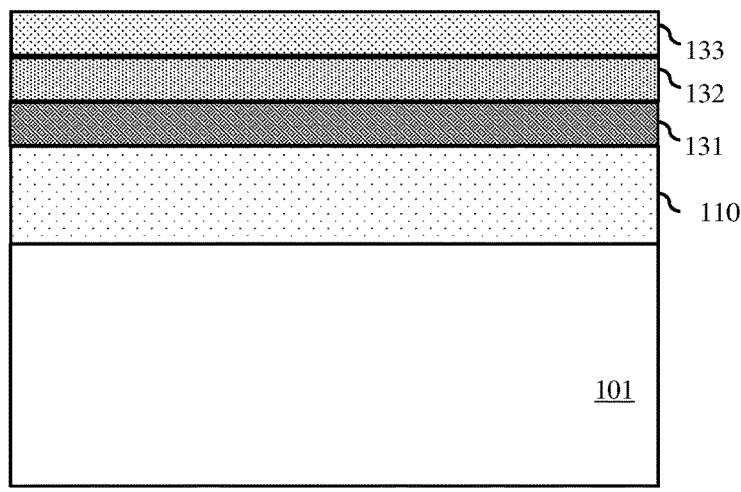

Next, multiple thin film cladding material layers can be deposited above the insulator layer 110 (see process 706 and FIG. 9). For purposes of illustration, FIG. 9 shows three stacked cladding material layers 131-133 extending laterally across and covering the entire exposed area of the insulator layer 110 within the first opening. However, it should be understood that FIG. 9 is not intended to be limiting. Alternatively, any number of two or more stacked cladding material layers could be deposited at process 706 so as to extend laterally across and cover the entire exposed area of the insulator layer 110, as long as at least two the cladding material layers have different refractive indices and as long as they all have smaller refractive indices that the material that will subsequently be used to form the waveguide core at process 710 discussed in greater below. Also, alternatively, different sections of the deposited cladding material layers can be different (e.g., one section can include a single cladding material layer and the other can include a stack of multiple cladding materials, the two sections can include stacks of different cladding material layers, etc.). In any case, selection of the number of cladding material layers, the materials of the different cladding material layers, the stacking order of those cladding material layers, etc., can be made to facilitate achieving the desired field confinement and optical mode in the resulting optical waveguide (e.g., see the above discussion of potential cladding materials and also the above discussion of FIGS. 3.1a-3.5d).

Figure 10:
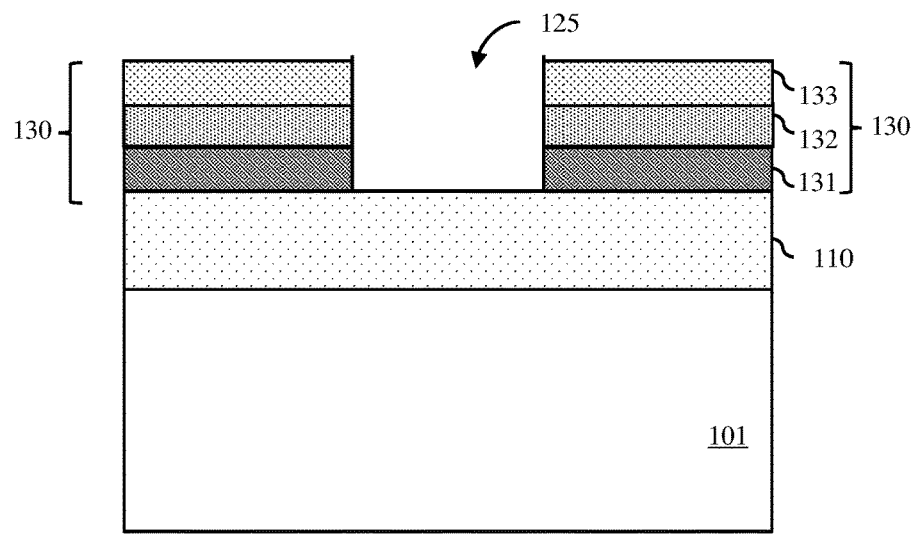
Figure 11:
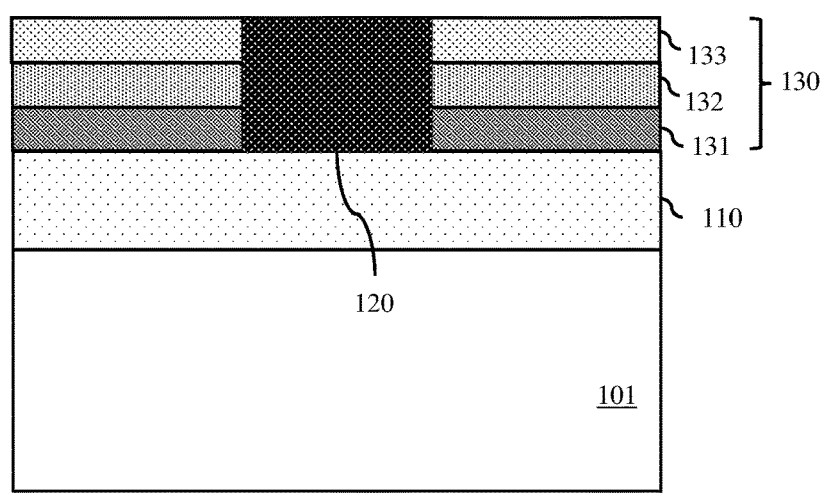

A second opening 125 can be formed (e.g., lithographically patterned and etched) such that it is essentially centered on the multiple cladding material layers and such that it extends vertically through the cladding material layers (e.g., 131-133) down to the insulator layer 110 (see process 708 and FIG. 10). This second opening 125 can be formed so as to split the multiple cladding material layers into two symmetric stacks 130, as illustrated. However, it should be understood that if different sections of the cladding material layers are different, the second opening 125 can be formed at the interface between the different section so as to form asymmetric cladding structures (e.g., as in the optical waveguides 100.3-100.5 of FIGS. 1.3-1.5 described above with regard to the structure embodiments).

Next, waveguide core material can be deposited so as to fill the second opening 125 and a polishing process (e.g., a conventional chemical mechanical polishing (CMP) process) can be performed so as to remove any of the waveguide core material from above the upper most cladding material layer, thereby forming the waveguide core 120 within the second opening 125 (see process 710). The core material could be, for example, a silicon and nitrogen-containing compound, such as standard stoichiometric silicon nitride ($Si_3N_4$) or some other suitable core material having a larger refractive index than the insulator layer 110 and any of the previously deposited cladding material layers. The shape of the second opening 125 formed at process 708 can be essentially rectangular, as illustrated, so that the shape of the waveguide core 120 formed therein at process 708 is also essentially rectangular, as illustrated, and suitable for use in a ridge waveguide (e.g., in any of the optical waveguides 100.1-100.5 of FIGS. 1.1-1.5, respectively).

It should, however, be understood that alternative processing could be performed so as to change the shape of the second opening 125 at process 708 and thereby change the shape of the waveguide core 120 formed therein at process 710. For example, an initial second opening could be performed at process 708 followed by a selective isotropic etch process, which recesses the exposed vertical surfaces of the first cladding material layer 131, thereby changing the shape of the second opening. Thus, when the waveguide core 120 is formed within the second opening at process 710 it has a shape suitable for use in a rib waveguide (e.g., in the optical waveguides 400.1-400.5 of FIGS. 4.1-4.5, respectively).

Additionally, it should be understood that, instead of a single second opening, a pair of parallel second openings could alternatively be formed at process 708 such that a pair of parallel waveguide cores suitable for use in a slot waveguide are formed therein at process 708 (e.g., in the optical waveguides 500.1-500.5 of FIGS. 5.1-5.5, respectively).

Formation of the waveguide core at process 710 can be followed by formation of an interlayer dielectric (ILD) material layer 140 so as to cover the top surface of the waveguide core 120 (see process 712 and FIG. 1.2). This ILD material layer 140 can specifically have a refractive index that is smaller than that of the core material so that it too functions as cladding material for the optical waveguide. Thus, for example, if the waveguide core is an $Si_3N_4$ core, then the ILD material layer 140 could be, for example, another silicon dioxide layer, which, as mentioned above, has a refractive index smaller than 1.6. Alternatively, this ILD material layer 140 could be any other suitable ILD material layer with a smaller refractive index than the waveguide core.

Figure 12:
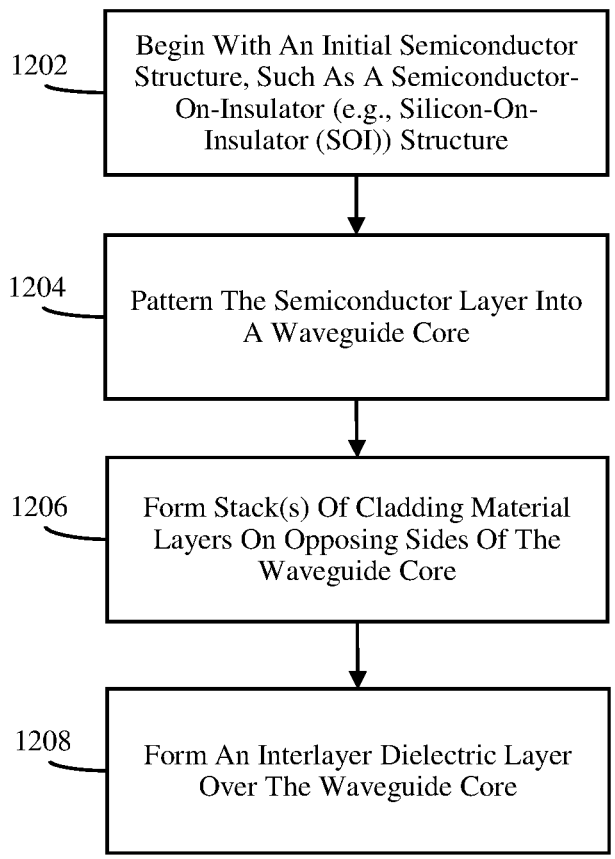
FIG. 12 is a flow diagram illustrating another technique for forming an optical waveguide.
Figure 13:
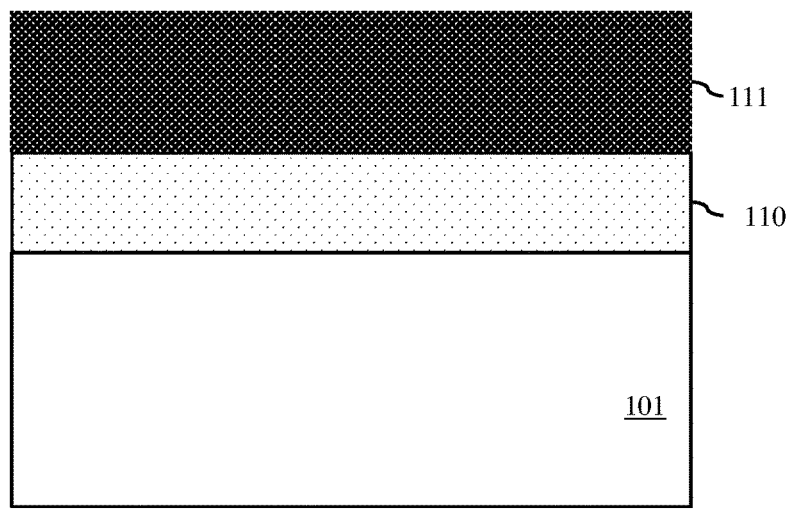
FIGS. 13-17 are cross-section diagrams illustrating partially completed structures formed according to the flow diagram of FIG. 7.
Figure 14:
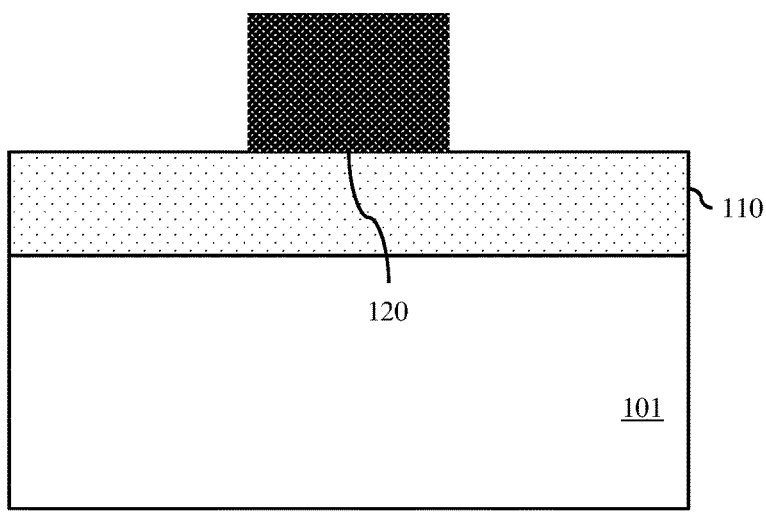

FIG. 12 is a flow diagram illustrating an alternative technique for forming an optical waveguide. For purposes of illustration, this technique is also described with respect to formation of the optical waveguide 100.2 shown in FIG. 1.2. Specifically, the method can begin with an initial semiconductor structure (see process 702 and FIG. 13). This initial semiconductor structure can be, for example, a semiconductor-on-insulator structure (e.g., a silicon-on-insulator (SOI) structure). Such a semiconductor-on-insulator structure can include, for example, a semiconductor substrate 101 (e.g., a silicon substrate), an insulator layer 110 (e.g., a silicon dioxide layer, also referred to herein as a buried oxide (BOX) layer) on the semiconductor substrate 101, and a semiconductor layer 111 (e.g., a silicon layer with a refractive index greater than 3) on the insulator layer 110.

The semiconductor layer 111 can be lithographically patterned and etched so as to form the waveguide core 120 (e.g., a silicon core) on the insulator layer 110 (see process 1204). As illustrated, the waveguide core 120 could be formed at process 1204 such that it is essentially rectangular in shape and, thus, suitable for use in a ridge waveguide (e.g., in the optical waveguides 100.1-100.5 of FIGS. 1.1-1.5, respectively). Alternatively, processing could be performed at process 1204 so that the shape of the waveguide core is suitable for use in a rib waveguide (e.g., in the optical waveguides 400.1-400.5 of FIGS. 4.1-4.5, respectively) or so as to form multiple parallel waveguide cores suitable for use in a slot waveguide (e.g., in the optical waveguides 500.1-500.5 of FIGS. 5.1-5.5, respectively).

Figure 15:
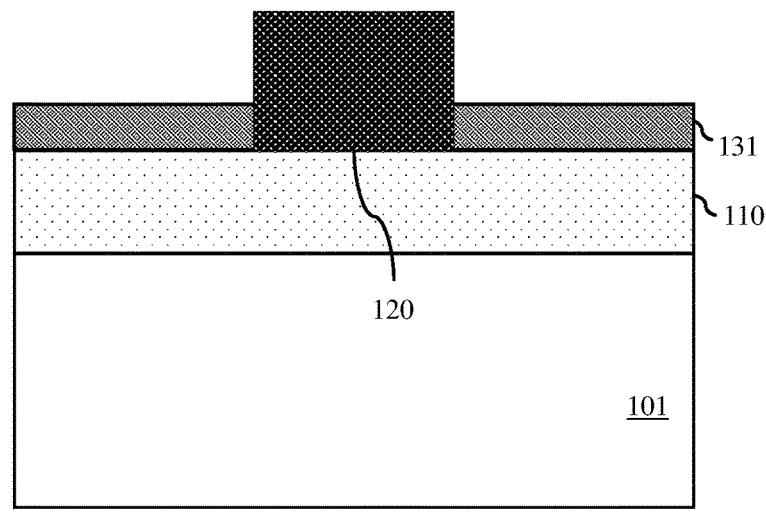
Figure 16:
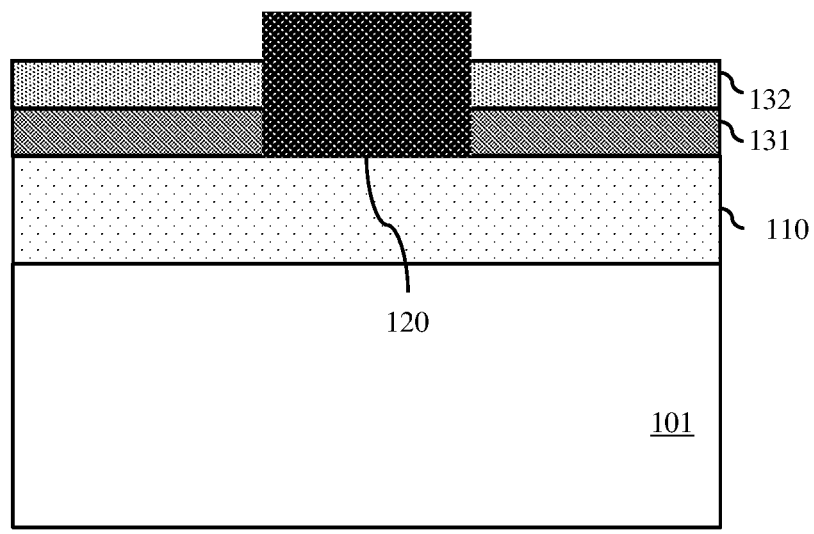
Figure 17:
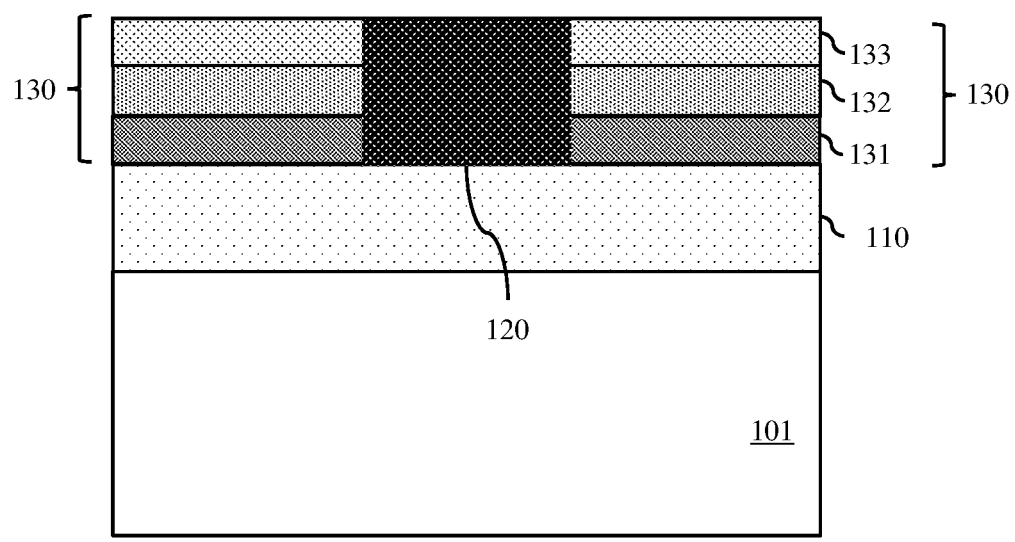

Next, a series of cladding material layer deposition and recess processes can be performed (see process 1206). As illustrated in FIGS. 15-17, process 1206 can be performed so as to form symmetric stacks 130 of cladding material layers on opposing sides of the waveguide core 120. For purposes of illustration, symmetric stacks 130 with three cladding material layers 131-133 are shown as being formed at process 1206. However, it should be understood that FIGS. 15-17 are not intended to be limiting. Alternatively, symmetric stacks with only two cladding material layers could be formed at process 1206 or symmetric stacks with more than three cladding material layers could be formed at process 1206. Alternatively, process 1206 can include some masked steps so that the resulting cladding structures on opposing sides of the waveguide core 120 are asymmetric (e.g., to form any of the optical waveguides 100.3-100.5 of FIGS. 1.3-1.5 described above with regard to the structure embodiments). In any case, the cladding material layers deposited at process 1206 should all have refractive indices smaller than that of the waveguide core 120. Additionally, selection of the number of cladding material layers, the materials of the different cladding material layers, the stacking order of those cladding material layers, etc., can be made to facilitate achieving the desired field confinement and optical mode in the resulting optical waveguide (e.g., see the above discussion of potential cladding materials and also the above discussion of FIGS. 3.1a-3.5d).

An interlayer dielectric (ILD) material layer 140 can subsequently be formed so as to cover the top surface of the waveguide core 120 (see process 1208 and FIG. 1.2). This ILD material layer 140 can specifically have a refractive index that is smaller than that of the core material so that it too functions as cladding material for the optical waveguide. Thus, for example, if the waveguide core is a silicon core, then the ILD material layer 140 could be, for example, another silicon dioxide layer, which, as mentioned above, has a refractive index smaller than 1.6. Alternatively, this ILD material layer 140 could be any other suitable ILD material layer with a smaller refractive index than the waveguide core.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a waveguide core; and
a stack of cladding material layers positioned laterally adjacent to a sidewall of the waveguide core, wherein each of the cladding material layers in the stack abuts the sidewall, wherein at least two of the cladding material layers in the stack have different refractive indices, and
wherein the waveguide core has a bottommost surface substantially aligned with a bottommost surface of the stack of cladding material layers.

2. The structure of claim 1,
wherein the stack comprises: a first cladding material layer; and a second cladding material layer on the first cladding material layer, and
wherein the first cladding material layer and the second cladding material layer have smaller refractive indices than the waveguide core.

3. The structure of claim 2, wherein the first cladding material layer has a first refractive index and wherein the second cladding material layer has a second refractive index that is smaller than the first refractive index.

4. The structure of claim 2, wherein the first cladding material layer has a first refractive index and wherein the second cladding material layer has a second refractive index that is larger than the first refractive index.

5. The structure of claim 1, further comprising an additional stack of the cladding material layers positioned laterally adjacent to an opposite sidewall of the waveguide core, wherein the stack and the additional stack are symmetric.

6. The structure of claim 1, further comprising at least one cladding material layer positioned laterally adjacent to an opposite sidewall of the waveguide core, wherein the stack and the at least one cladding material layer on the opposite sidewall are asymmetric.

7. The structure of claim 1, wherein the waveguide core is any of a ridge-type waveguide core, a rib-type waveguide core, and a slot-type waveguide core.

8. The structure of claim 1, wherein the waveguide core comprises any of silicon nitride and silicon.

9. A structure comprising:
a waveguide core; and
a stack of cladding material layers positioned laterally adjacent to a sidewall of the waveguide core, wherein each of the cladding material layers in the stack abuts the sidewall, wherein the stack comprises at least three cladding material layers, wherein at least two of the cladding material layers in the stack have different refractive indices, and
wherein the waveguide core has a bottommost surface substantially aligned with a bottommost surface of the stack of cladding material layers.

10. The structure of claim 9,
wherein the stack comprises: a first cladding material layer; a second cladding material layer on the first cladding material layer; and a third cladding material layer on the second cladding material layer,
wherein the first cladding material layer, the second cladding material layer, and the third cladding material layer have smaller refractive indices than the waveguide core, and
wherein the second cladding material layer has a different refractive index that the first cladding material layer and the third cladding material layer.

11. The structure of claim 10, wherein the first cladding material layer has a first refractive index, wherein the second cladding material layer has a second refractive index, wherein the third cladding material layer has a third refractive index, and wherein the first refractive index and the second refractive index are smaller than the third refractive index.

12. The structure of claim 10, wherein the first cladding material layer has a first refractive index, wherein the second cladding material layer has a second refractive index, wherein the third cladding material layer has a third refractive index, and wherein the second refractive index is larger than the first refractive index and the third refractive index.

13. The structure of claim 9, further comprising an additional stack of the cladding material layers positioned laterally adjacent to an opposite sidewall of the waveguide core, wherein the stack and the additional stack are symmetric.

14. The structure of claim 9, further comprising at least one cladding material layer positioned laterally adjacent to an opposite sidewall of the waveguide core, wherein the stack and the at least one cladding material layer on the opposite sidewall are asymmetric.

15. The structure of claim 9, wherein the waveguide core is any of a ridge-type waveguide core, a rib-type waveguide core, and a slot-type waveguide core.

16. The structure of claim 9, wherein the waveguide core comprises any of silicon nitride and silicon.

17. A method comprising:
forming a waveguide core; and
forming a stack of cladding material layers,
wherein the forming of the waveguide core and the forming of the stack of cladding material layers are performed such that the stack is positioned laterally adjacent to a sidewall of the waveguide core, such that each of the cladding material layers in the stack abuts the sidewall and such that at least two of the cladding material layers in the stack have different refractive indices, and the waveguide core has a bottommost surface substantially aligned with a bottommost surface of the stack of cladding material layers.

18. The method of claim 17, wherein the forming of the stack and the forming of the waveguide core are performed such that the cladding material layers of the stack all have smaller refractive indices than the waveguide core.

19. The method of claim 17, wherein the forming of the stack and the forming of the waveguide core are performed so as to establish an optical mode.

20. The method of claim 17, wherein the forming of the waveguide core comprises forming any of a silicon nitride waveguide core and a silicon waveguide core.

* * * * *